United States Patent [19]

Lindemann et al.

[11] 4,101,492

[45] Jul. 18, 1978

[54] AQUEOUS EMULSION COPOLYMERS CONTAINING LOWER ALKYL HYDROGEN POLYSILOXANE

[75] Inventors: Martin K. Lindemann, Greenville; Donald M. Wacome, Greer, both of S.C.

[73] Assignee: Chas. S. Tanner Co., Greenville, S.C.

[21] Appl. No.: 772,961

[22] Filed: Mar. 3, 1977

[51] Int. Cl.² .......................................... C08F 283/12
[52] U.S. Cl. ...................... 260/29.6 NR; 260/29.2 M; 260/29.6 HN; 260/29.6 RB; 260/29.6 RW; 260/827
[58] Field of Search ......... 260/29.2 M, 827, 29.6 NR, 260/29.6 RW, 29.6 HN, 29.6 RB

[56] References Cited

U.S. PATENT DOCUMENTS

| | | | |
|---|---|---|---|
| 2,965,593 | 12/1960 | Dietz | 260/29.6 NR |
| 3,203,919 | 8/1965 | Brachman | 260/29.6 NR |
| 3,445,415 | 5/1969 | Cekada, Jr. et al. | 260/827 |
| 3,468,836 | 9/1969 | Sekmakas | 260/827 |
| 3,575,910 | 4/1971 | Thomas | 260/827 |
| 3,694,478 | 9/1972 | Adams et al. | 260/827 |
| 3,732,184 | 5/1973 | Lindemann et al. | 260/29.6 H |
| 3,808,287 | 4/1974 | Thomas | 260/827 |
| 3,852,233 | 12/1974 | Lindemann | 260/29.6 TA |
| 3,898,300 | 8/1975 | Hilliard | 260/827 |

*Primary Examiner*—Eugene C. Rzucidlo
*Attorney, Agent, or Firm*—Dressler, Goldsmith, Clement, Gordon & Shore, Ltd.

[57] ABSTRACT

Aqueous emulsions adapted for application to textile fabrics and which provide improved water and soil resistance are supplied using aqueous emulsion copolymers of nonreactive monoethylenically unsaturated monomers providing a $T_g$ below about 20° C. with from 0.5% to 20% of reactive monoethylenically unsaturated monomer providing active hydrogen, preferably OH and most preferably the

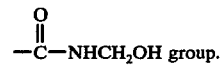

group.

and from 1 to 40% of a terminal-blocked lower alkyl hydrogen polysiloxane having a viscosity of from 20 to 1000 cP at 20° C. In preferred practice, from 0.5 to 4% of the polysiloxane is used, and at least 50% of the copolymer is vinyl acetate.

19 Claims, No Drawings

AQUEOUS EMULSION COPOLYMERS CONTAINING LOWER ALKYL HYDROGEN POLYSILOXANE

The present invention relates to aqueous emulsion copolymers and to aqueous emulsions containing the same and which are adapted to deposit binder particles and coatings which cure thermally to provide a cured product which is soft and rubbery and which possesses improved resistance to water and to oily soil.

My coworkers have previously copolymerized hydroxy-functional acrylates with acrylic esters and lower alkyl hydrogen polysiloxane in organic solvent solution, relying upon the chain transfer characteristics of the solvent to incorporate the polysiloxane into an acrylic copolymer chain. The result is a system laden with volatile organic solvent and which contains copolymer of low molecular weight as is characteristic of polymers produced by polymerization in organic solvent solution. These low molecular weight polymers have little physical integrity and when they are cross-linked sufficiently to provide a physically tough material, the excessive cross-linking which is needed destroys the soft and rubbery quality which is desired.

On the other hand, lower alkyl hydrogen polysiloxanes are polyfunctional and their incorporation into high molecular weight emulsion polymers particles which retain their capacity to coalesce at room or low temperature in order to form films and to serve as a binder for fibers is surprising, and the result is useful since the polysiloxane component of the soft rubbery copolymer provides improved water resistance and improved resistance to oily soil which is important in textile applications.

In accordance with this invention, nonreactive polymerizable monoethylenically unsaturated monomers are copolymerized with from 1–20% of a reactive monomer providing active hydrogen, and preferably the OH group, and from 1–40% of a lower alkyl hydrogen polysiloxane, the copolymerization being carried out in aqueous emulsion. It is particularly preferred to use small amounts of the lower alkyl hydrogen polysiloxane from 0.5% to about 4% thereof, especially in combination with from 1% to 10% of a reactive monomer providing the N-methylol group, since this enables a superior low temperature cure. It is also a feature of this invention to employ at least 15% of vinyl acetate in the copolymer since this provides copolymers which are quite advantageous in commerce and which were not contemplated in the effort of my coworkers noted hereinbefore.

It is noted in passing that all proportions herein are by weight unless otherwise noted, and that the term "lower alkyl" denotes $C_1$ - $C_4$ alkyl groups.

The essence of a practical coating system for textile application is an aqueous emulsion system of relatively high molecular weight water resistant polymer of low $T_g$ which is soft and rubbery in physical character and which retains a thermosetting cure capacity to permit the development of wash resistance and dry clean resistance after application. $T_g$ is the glass transition temperature and a $T_g$ below about 20° C., preferably below 0° C. permits the copolymer particles to coalesce with one another or with fibers. The achievement of such an aqueous system is the objective of this invention, and such achievement represents an industrial problem of long standing in the textile industry.

Referring more particularly to the nonreactive polymerizable monoethylenically unsaturated monomers which are useful in accordance with this invention, these may be constituted by acrylic esters, such as methyl acrylate or methacrylate or the corresponding ethyl, butyl or 2-ethyl hexyl esters. Styrene, vinyl toluene or acrylonitrile may also be present. These monomers are usually employed in combination to provide the low glass transition temperature which is needed.

Since application to textiles is of particular importance, this invention prefers to employ vinyl acetate in an amount to provide at least 15% of the weight of the copolymer, preferably at least 50%. The vinyl acetate would be used together with a plasticizing monomer, which may be an acrylate ester such as ethyl, n-butyl, isobutyl or ethyl hexyl acrylate, to provide the desired low Tg. These plasticizing esters may be totally or partially replaced with ethylene.

The reactive monomers are also monoethylenically unsaturated and carry a reactive group providing active hydrogen in addition to the polymerizable ethylenic group. The OH group is particularly contemplated, and this may be provided by 2-hydroxy ethyl acrylate, allyl alcohol or similar hydroxy-functional monoethylenic monomer. In line with accepted terminology, functionality other than that recited is not present unless otherwise specified.

It is particularly preferred to have the OH group present, at least in part, in the form of the

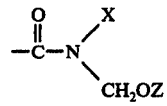

group where X is hydrogen or $CH_2OZ$, and Z is hydrogen or an etherifying monoalcohol containing from 1–8 carbon atoms. Suitable monomers for providing this nitrogen-based methylol group (the etherifying alkyl group is released on baking) are N-methylol acrylamide, N-methylol allyl carbamate and methyl, ethyl, propyl, butyl, ethoxy ethyl and butoxy ethyl ethers thereof, these being used alone or in admixture.

An important feature of this invention is the provision of a low temperature thermosetting cure. The N-methylol group is conventionally relied upon for this purpose and the cure is customarily measured by the insolubility obtained on baking. A bake of 230° F. applied for 1 minute represents minimal baking conditions and it is found herein that the combination of the alkalinity provided by the nitrogen atom in the methylol group and the acidity provided by the unreacted Si-H groups in the copolymer enable an important boost in cure capacity, especially under minimal baking conditions.

Other reactive monomers are also useful but these are less desirable, such as monoethylenically unsaturated amides illustrated by acrylamide, and monoethylenically unsaturated amines, illustrated by dimethyl aminoethyl acrylate.

A small proportion, up to about 2% of the copolymer, may be constituted by a monoethylenically unsaturated acid. Carboxylic acids are preferred, such as acrylic acid, methacrylic acid, itaconic acid or maleic acid, but sulphonic acids or their salts, such as 2-sulpho ethyl methacrylate or sodium vinyl sulphonate are also useful.

The lower alkyl hydrogen polysiloxanes are themselves known materials which are available in commerce. These are end-blocked materials of relatively low molecular weight which include $C_1 - C_4$ alkyl groups and Si-H groups in a ratio of at least about one alkyl group per Si-H group.

Examples of such polysiloxanes include ethyl-, propyl- and butyl-hydrogen polysiloxanes, and preferably methyl-hydrogen polysiloxanes. The preferred compounds possess a ratio between alkyl groups and Si-H groups, disregarding the terminal groups, such as the trimethylsilyl groups, of about 1:1.

Alkyl-hydrogen polysiloxanes are also suitable in which the above noted ratio is greater than 1:1, namely, up to about 13:1. Nevertheless, a ratio of alkyl group to Si-H group of more than 5:1, is less suitable. The alkyl-hydrogen polysiloxanes do not contain any hydrolysis-sensitive groups or hydroxyl groups, but are blocked at the ends, for example, by trimethylsilyl groups.

The alkyl-hydrogen polysiloxanes which can be used in the process of the invention have a viscosity of from 20 to 1000 cP at 20° C., and the methyl-hydrogen polysiloxanes which are particularly preferred have a viscosity from 20 to 350 cP at 20° C.

The lower proportions of alkyl hydrogen polysiloxane are especially important because these provide the highest molecular weight which is an important attribute of emulsion polymerization. Thus, from about 1% to about 4% of the weight of the polymer provides the best results herein.

It is stressed that the alkyl hydrogen polysiloxanes used herein are polyfunctional and the emulsion polymerization provides high molecular weight in the absence of solvent. It is surprising to find that cross-linking prior to cure is sufficiently avoided to permit the copolymer particles to coalesce with one another and to adhere to the fibers on which they are applied. Excessive premature cross-linking would effectively prevent the emulsion polymer particles from adhering to the fabric on which they were applied, and these would then simply wash out and not be useful.

The aqueous emulsion polymerization which is employed herein is itself conventional, reference being made to U.S. Pat. Nos. 3,852,233 and 3,732,184 which contain an amplified discussion thereof, the disclosure of these patents being incorporated by reference. Also, the emulsion polymerization will be amply illustrated in the Examples presented hereinafter.

It is desired to stress that the polysiloxane structure

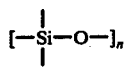

where n is a number providing the aforesaid viscosity, tends to segregate in the polymer which is formed, coming to the surface as a result of its own repellency. As a result, a small proportion of the alkyl hydrogen polysiloxanes provides significant water repellency and enhances the soil resistance of fabrics coated with the emulsions. Also, some of the reactivity is reactive with the cellulosic hydroxyl groups in cotton, so the emulsions of this invention are especially applicable to fabrics containing a proportion of cotton, e.g., blends of polyester fibers and cotton fibers.

The invention, by providing the reactive Si-H group, confers reactivity with the Si-alkoxy group, so polysiloxanes containing such groups, and especially the Si-OCH$_3$ group, can be used as curing coreactants.

An important aspect of this invention is the utilization of the aqueous emulsions disclosed herein to provide treated fabrics which are useful in a wash and wear application. For such purpose, it is appropriate to add to the aqueous emulsion of this invention glyoxalformaldehyde condensation products which are heat-hardening, and substantially monomeric, these being used in an amount of from about 3% to about 50%, based on the weight of the emulsion copolymer solids.

Catalysts are not needed for the cure which is desired in this invention, but it is normally desired to speed the cure, and Lewis acids are useful for this purpose. Dibutyl tin dilaurate is particularly useful and will be used as illustrative. Zinc nitrate is also a useful material which may be employed either alone or in combination with the dibutyl tin dilaurate.

It is desired to stress that the purpose of this invention is to supply water resistance and soil resistance to woven fabrics in a manner which resists washing and/or dry cleaning while introducing a minimum of undesired hardness. This is achieved in a most economical manner in accordance with this invention.

The invention is illustrated in the examples which follow in which all parts are by weight unless otherwise indicated.

PREPARATION OF METHYL HYDROGEN SILOXANE-CONTAINING COPOLYMER EMULSIONS

EXAMPLE 1

A 1 gallon stainless steel polymerization reactor, equipped with temperature controls and agitator was charged with the following materials in the order listed

| Materials | Weight (grams) |
| --- | --- |
| Water | 764 |
| t-octyl Phenoxy poly ethoxy ethanol;* (40 ethoxy groups per moledule) [70% in water] | 11.2 |
| Ferrous sulfate (1% solution in water) | 1 |

*Hereinafter referred to as nonionic surfactant A.

The pH was adjusted to 3.6 with 0.1 cc phosphoric acid.

In a separate vessel equipped with an agitator, a monomer emulsion was prepared by the addition of the following components, charged under good agitation in the order listed:

| | Grams |
| --- | --- |
| Water | 300 |
| nonionic surfactant A | 46.2 |
| 2-Hydroxy ethyl Acrylate | 15.7 |
| Vinyl Acetate | 432.5 |
| Butyl Acrylate | 353.8 |
| Methyl hydrogen siloxane (See note 1) | 73.3 |

A catalyst solution was prepared as follows:

| | |
| --- | --- |
| Water | 80.7 |
| Hydrogen Peroxide (35% Active) | 14.3 |
| Tertiary Butyl Hydroperoxide | 5 |

An activator solution was prepared as follows:

| | Grams |
| --- | --- |
| Water | 188 |
| Sodium Formaldehyde Sulfoxylate | 12 |

Note 1:Siloxan H-100 from Wacker-Chemie may be used.

The polymerization was carried out by first raising the temperature of the contents of the polymerization reactor to 50° C. The addition of the monomer emulsion to this vessel was then carried out at a continuous, uniform rate extended over a four hour period. The reaction was initiated and maintained by incremental additions of both catalyst and activator solutions in minimum amounts, determined by measurements of unreacted monomer present in the reaction. Totals of 67 grams of catalyst solution, and 133 grams of activator solution were used. The reaction pH was maintained between 3.5 and 4.1 with ammonium hydroxide (28%), a total of 4.2 cc was used.

Following completion of the monomer emulsion addition, the reaction was completed by maintaining the temperature at 50° C. and adding 1.5 cc of tertiary butyl hydroperoxide directly to the latex. The pH was then raised to 5.6 by the addition of 4 cc of 28% ammonium hydroxide.

The resulting product has the following properties:

| | |
|---|---|
| Total Solids | 36.9% |
| pH | 5 |
| Viscosity (Brookfield) at 60 RPM (cps) | 12 |
| Particle Size | 0.16 micron |
| Intrinsic Viscosity (in dimethyl formamide) | 0.41 dl/g |
| Tg (Calculated) | −13° C. |

| | % Insolubles (See Note 2) | |
|---|---|---|
| Catalyst | Cure 1 min. at 230° F. | Cure 5 min. at 280° F. |
| A mixture of 0.57 parts per 100 parts of polymer solids of dibutyl tin dilaurate (supplied in 20% emulsion in water) and 3.44 parts per 100 parts of polymer solids of zinc nitrate (supplied in 60% water solution). This catalyst mixture is identified hereinafter as "Catalyst Mixture A". | 8% | 43% |

Note 2: A specimen is baked at the given temperature for the time listed and then extracted with 1,1,1-trichloroethylene. The per cent insoluble value is obtained by pouring 25 ml. of the polymer emulsion on a glass plate, and allowing it to dry overnight at room temperature. Water is then removed by 24 hours storage in a desiccator. The dry film is then scraped off the glass plate and 4 grams thereof are placed in a Soxhlet thimble. Extraction is then carried out with 350 ml. of the named solvent at boiling for 48 hours. The solvent is then evaporated and the residue is dried overnight at 95° C. in a forced air oven. The weight of the polymer sample after extraction is compared with the weight of the sample before extraction to provide the per cent insoluble value.

The preceding Example 1 can be repeated by omitting the butyl acrylate component and instead carrying out the polymerization reaction while maintaining the head space in the polymerization reactor filled with ethylene under pressure (65 atmospheres). In this way substantially the same results are obtained, but the copolymer is plasticized with ethylene instead of butyl acrylate. The copolymerization of vinyl acetate with ethylene is further illustrated in U.S. Pat. No. 3,852,233 dated Dec. 3, 1974.

EXAMPLE 2

The procedure set forth in Example 1 was repeated with the following changes in composition of the monomer emulsion:

| | Grams |
|---|---|
| Water | 300 |
| nonionic surfactant A | 46.2 |
| Methyl Acrylate | 421.4 |
| Ethyl Acrylate | 217.8 |
| 2-Ethyl Hexyl Acrylate | 58.1 |

| | Grams |
|---|---|
| 2-Hydroxy Ethyl Acrylate | 15.7 |
| Methyl hydrogen siloxane (See Note 1 of Example 1) | 73.3 |

The resulting product had the following properties:

| | |
|---|---|
| Total Solids | 39.4% |
| Particle Size | 0.15μ |
| Tg (Calculated) | 12° C. |
| Intrinsic Viscosity (in dimethyl formamide) | 0.41 dl/g |
| Viscosity (Brookfield at 60 RPM | 14 cps |

| | % Insolubles | |
|---|---|---|
| | Cure 1 min. at 230° F. | Cure 5 min. at 280° F. |
| Catalyst Mixture A | 10.4 | 62.8 |

EXAMPLE 3

A polymerization reactor of the type cited in the previous example was charged with the following materials in the order listed:

| | Grams |
|---|---|
| Water | 900 |
| Methylol acrylamide 16.9% solution (See Note 3) | 300 |
| Sodium lauryl sulfate (30% in water) | 3.3 |
| Seed latex at 45% total solids (See Note 4) | 11.1 |
| Ferrous sulfate 1% solution in water | 1.0 |
| nonionic surfactant A | 14.3 |
| Itaconic Acid | 5.0 |
| Diammonium Hydrogen Phosphate | 3.1 |

Note 3 - The reaction product of equimolar amounts of acrylamide and formaldehyde.
Note 4 - A commercially prepared acrylic latex having an average particle size of 0.18 microns.

On completion of this preparation, a monomer solution was made using the following components:

| | Grams |
|---|---|
| Acrylonitrile | 200 |
| Butyl Acrylate | 780 |
| Methyl hydrogen siloxane (See Note 1 of Example 1) | 20 |

500 grams of this solution were slowly added under a nitrogen blanket with good agitation to the emulsion already present in the reaction vessel. This reaction mixture was brought up to 48° C. by means of jacket heating, and polymerization initiated and completed by additions of catalyst and activator solutions prepared as follows:

| | | Grams |
|---|---|---|
| A. | Oxidant | |
| | Ammonium persulfate | 7.8 |
| | Water | 32.0 |
| B. | Reductant | |
| | Water | 32 |
| | Sodium formaldehyde sulfoxylate | 3.5 |
| | Ammonium hydroxide, 28% | 0.9 |

No attempt was made to control the reaction temperature, and the reaction was deemed completed when the batch temperature decreased measurably. The highest temperature reached was 71° C. and the total solids were 39.5%. At this point the batch temperature was dropped to 50° C. and the reamining 500 grams of monomers were added and reaction initiated and carried out as in the first step.

The resulting product had the following properties:

| Total solids | 45.3% |
|---|---|
| pH | 6.0 |
| Viscosity (Brookfield) at 60 RPM | 108 cps. |
| Particle size | 0.22 micron |
| Intrinsic Viscosity (in dimethyl formamide) | 1.80 dl/g |
| $T_g$ (calculated | −14° C. |

| | % Insolubles | |
|---|---|---|
| | Cure 1 min. at 230° F. | Cure 5 min. at 280° F. |
| Catalyst Mixture A | 96.6 | 96.0 |

As a point of interest, in the absence of the aproximately 2% of siloxane component used in this example, the insolubility obtained by curing 1 minute at 230° F. is only about 80%.

EXAMPLE 4

The recipe and procedure used in Example 3 was repeated except that the amounts of nonionic surfactant and sodium lauryl sulfate along with methyl hydrogen siloxane were increased by 100%.

The resulting product had the following properties:

| Total solids | 45.7% |
|---|---|
| pH | 6.0 |
| Viscosity (Brookfield) at 60 RPM | 132 cps. |
| Particle size | 0.27 micron |
| Intrinsic Viscosity (in dimethyl formamide) | 1.75 dl/g |
| $T_g$ (Calculated) | −14° C. |

The intrinsic viscosity indicates that cross-linking prior to cure is not excessive. This also applies to Example 3.

| | % Insolubles | |
|---|---|---|
| | Cure 1 min. at 230° F. | Cure 5 min. at 280° F. |
| Catalyst Mixture A | 94.9 | 94.1 |

Each of the foregoing examples can be utilized as disclosed for the treatment of polyethylene terephthalatecotton woven fabrics to increase the water and soil resistance with minimum introduction of added hardness. The product of Example 1 is particularly appropriate for textile application because of the large proportion of vinyl acetate which is present therein. The further economy achieved by utilizing ethylene is also important. Example 2 illustrates the fact that the results obtained using vinyl acetate compare well with an entirely acrylic system which is generally more costly. Examples 3 and 4 demonstrate the very significant increase in insolubility which is obtained using only 2% of siloxane component in combination with about 5% of N-methylol acrylamide. Doubling the proportion of the siloxane component increased the premature cross-linking while decreasing the insolubility which is obtained. These are most surprising results.

The invention is defined in the claims which follow.

We claim:

1. An aqueous emulsion comprising water having emulsified therein particles of copolymer produced by copolymerization in aqueous emulsion of nonreactive polymerizable monoethylenically unsaturated monomers providing a Tg below about 20° C. with from 0.5% to 20% of reactive monoethylenically unsaturated monomer providing active hydrogen and from 1 to 40% of a terminal-blocked lower alkyl hydrogen polysiloxane having a viscosity in the range from 20 to 1,000 cP at 20° C., the ratio of alkyl groups to Si-H groups in said siloxane being in the range of from 13:1 to about 1:1, the terminal groups not being included in said ratio.

2. An aqueous emulsion as recited in claim 1 in which said copolymer includes at least 15% of vinyl acetate.

3. An aqueous emulsion as recited in claim 1 in which said lower alkyl hydrogen polysiloxane contains methyl groups in a ratio of from 5:1 to about 1:1 and has a viscosity in the range of from 20 to 350 cP at 20° C.

4. An aqueous emulsion as recited in claim 1 in which said lower alkyl hydrogen polysiloxane is present in an amount of from 0.5% to about 4%.

5. An aqueous emulsion as recited in claim 1 in which said reactive monomer supplies the OH group.

6. An aqueous emulsion as recited in claim 5 in which said reactive monomer provides the $$-\overset{O}{\underset{\|}{C}}-N\overset{X}{\underset{CH_2OZ}{\diagdown}}$$

group where X is hydrogen or $CH_2OZ$ and Z is hydrogen or the residue of an etherifying monoalcohol containing from 1 to 8 carbon atoms, said named reactive monmer being present in an amount of from 1% to 10%.

7. An aqueous emulsion as recited in claim 6 in which said reactive monomer is N-methylol acrylamide.

8. An aqueous emulsion as recited in claim 6 in which said reactive monomer is N-methylol allyl carbamate.

9. An aqueous emulsion as recited in claim 1 in which said reactive momomer comprises hydroxy ethyl acrylate.

10. An aqueous emulsion as recited in claim 1 in which said reactive monmer comprises a monoethylenically unsaturated acid in an amount up to about 2% of the copolymer.

11. An aqueous emulsion as recited in claim 1 in which said copolymer has a Tg below 0° C.

12. An aqueous emulsion as recited in claim 11 in which said copolymer comprises at least 50% of vinyl acetate.

13. An aqueous emulsion as recited in claim 12 in which said copolymer further includes ethylene.

14. An aqueous emulsion as recited in claim 1 in which said emulsion further includes a heat-hardening glyoxal-formaldehyde condensate.

15. An aqueous emulsion as recited in claim 1 in which said emulsion includes a Lewis acid catalyst.

16. An aqueous emulsion as recited in claim 15 in which said catalyst comprises dibutyl tin dilaurate.

17. An aqueous emulsion comprising water having emulsified therein particles of copolymer produced by copolymerization in aqueous emulsion of nonreactive polymerizable monoethylenically unsaturated monomers providing a $T_g$ below 0° C. and selected from vinyl acetate, acrylate and methacrylate esters, styrene, vinyl toluene and acrylonitrile, with from 0.5% to 20% of reactive monoethylenically unsaturated monomer providing 1% to 10% of monomer selected from N-methylol acrylamide, N-methylol allyl carbamate and ethers thereof with monoalcohols containing up to 8 carbon atoms, and from 1% to 4% of a terminal-blocked methyl hydrogen polysiloxane having a viscosity in the range of from 20 to 350 cP at 20° C., the ratio of methyl groups to Si-H groups in said siloxane being in the range of from 5:1 to about 1:1, the terminal groups not being included in said ratio.

18. An aqueous emulsion as recited in claim 17 in which at least 50% of the copolymer is constituted by vinyl acetate.

19. An aqueous emulsion as recited in claim 17 in which the ratio of methyl group to Si-H groups is about 1:1.

* * * * *